United States Patent
Chockalingam et al.

(10) Patent No.: US 9,483,485 B1
(45) Date of Patent: Nov. 1, 2016

(54) RESTORE DATABASE FROM BACKUP SYSTEM WHERE FULL AND INCREMENTAL BACKUPS ARE PERFORMED SIMULTANEOUSLY

(71) Applicant: EMC CORPORATION, Hopkinton, MA (US)

(72) Inventors: Elango Chockalingam, Bangalore (IN); Milind Parvatikar, Bangalore (IN); Upanshu Singhal, Bangalore (IN); Pradeep Annappa, Bangalore (IN); Krishnendu Bagchi, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 41 days.

(21) Appl. No.: 13/631,753

(22) Filed: Sep. 28, 2012

(51) Int. Cl.
*G06F 7/00* (2006.01)
*G06F 17/30* (2006.01)

(52) U.S. Cl.
CPC ................. *G06F 17/3015* (2013.01)

(58) Field of Classification Search
CPC .................................................. G06F 17/3015
USPC ........................................................ 707/644
See application file for complete search history.

(56) References Cited

U.S. PATENT DOCUMENTS

| | | | |
|---|---|---|---|
| 8,185,505 B1 * | 5/2012 | Blitzer et al. ................. | 707/679 |
| 2007/0185922 A1 * | 8/2007 | Kapoor et al. ................ | 707/202 |
| 2011/0153567 A1 * | 6/2011 | Sawdon et al. ............... | 707/645 |

* cited by examiner

*Primary Examiner* — Ajith Jacob
(74) *Attorney, Agent, or Firm* — Staniford Tomita LLP

(57) ABSTRACT

This disclosure relates to a method, article of manufacture, and apparatus of restoring a database allowing simultaneous full and incremental backups. In some embodiments, this includes receiving, by a server, a request for restoring as of a restore point-in-time, in response to the request, retrieving by the server a set of backup objects, sorting the set of backup objects in descending order, locating a first incremental backup in the set of backup objects based on the restore point-in-time and a first incremental backup start time associated with the first incremental backup, locating a full backup in the set of backup objects based on the first incremental backup start time, a full backup start time and a full backup end time associated with the full backup, storing the full backup and the first incremental backup in a list of restoring objects, and sending, by the server, the list of restoring objects.

10 Claims, 4 Drawing Sheets

RESTORE DATABASE FROM BACKUP SYSTEM WHERE FULL AND INCREMENTAL BACKUPS ARE PERFORMED SIMULTANEOUSLY

FIELD

The present invention relates generally to storage systems and specifically to systems and methods of restoring backup data in storage systems.

BACKGROUND

The need for business continuance and fast data recovery is acute and well known. Businesses may use data protection techniques to prevent data loss or to meet regulatory requirements. Data protection techniques may involve taking full backups of the data and thereafter taking incremental backups to track data changes. An incremental backup may comprise an object containing files or blocks that have changed since the last incremental backup. During recovery, the incremental backups may be applied to the full backup copy to restore the data to a point-in-time.

A significant amount of time and resources may be required, however, to perform a full backup since the backup is a complete copy of all the data stored on the primary storage device at a particular point-in-time. The delay may introduce expense to a data protection solution. Additionally, restore operations may not be efficient and/or effective.

Additionally, simultaneous full and incremental backups may result in deadlock, blocker issues, and/or confusions during restore. For example, it may be challenging to choose the correct full backup data and apply the correct incremental backup. During a backup, some incremental changes may be recorded prior to the completion of a full backup. Applying such incremental changes to the full backup in order to restore to a point-in-time may not yield the correct result.

There is a need, therefore, for an improved method or system that allows efficient simultaneous full and incremental backups on a storage system, and also effectively performs restore of the backup data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
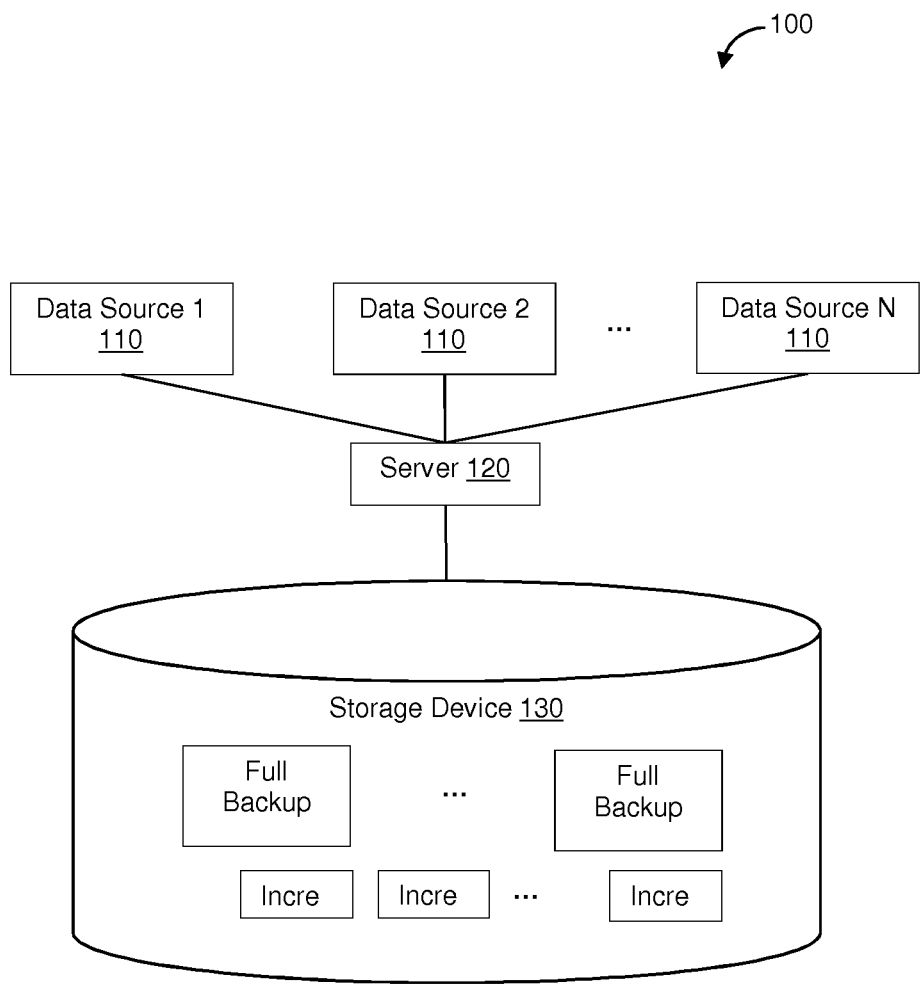
FIG. 1 is a diagram of a storage system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are methods and systems for restoring data in an efficient backup storage system, where the system allows simultaneous full and incremental backups. Some conventional methods and systems only allow taking incremental backups after the completion of a full backup. Such conventional methods and systems may be inefficient, since the full backup may take a significant amount of time to complete. Allowing simultaneous full and incremental backups may improve efficiency, however restoring the backup data may be challenging. Accordingly, it may be desirable to have an effective method and system to restore backup data in a correct order, especially in a system that allows simultaneous full and incremental backups.

FIG. 1 is a system architecture illustrating an embodiment of a data storage system. Storage system 100 includes server 120, data sources 110, and storage device 130. Server 120 may be a data storage server that stores backup data on storage device 130 and transfers backup data to data sources 110 when necessary. Data sources 110 may be backup clients, such as a laptop, desktop, or a virtual machine. As illustrated by FIG. 1, there may be any number of clients. Further, data sources 110 may be virtual clients residing across multiple physical clients.

In some embodiments, data sources 110 may be in communication with server 120 using a dedicated communication link, one or more networks, a local area network, a wide area network, a storage area network, the Internet, a wired network, and/or wireless network, among others. Similarly, communication links connecting data sources 110, server 120, and storage device 130 may be a dedicated communication link, one or more networks, a local area network, a wide area network, a storage area network, the Internet, a wired network, and/or wireless network, among others.

Storage device 130 may comprise a non-transitory storage system facilitating storage and retrieval of a collection of data by other systems. In some embodiments, storage system 100 may include a plurality of servers 120, storage devices 130, and data sources 110. Further, server 120 may be connected to multiple storage devices through different connectors and over various types of connections.

Storage device 130 may include one or more disks, each disk containing a different portion of data stored the device. Storage space may be apportioned pursuant to a file system, may be logical or virtual (i.e. not corresponding to underlying physical storage), or may be subdivided into a plurality of volumes or logical devices. The logical devices may correspond to the physical storage space of the disks. For example, a physical storage device may contain a plurality of logical devices and/or a single logical device could span across multiple physical devices. Server 120 may be configured to access any combination of logical devices independent of the actual correspondence between the logical devices and the physical devices. Storage device 130 may be provided as a stand-alone device in communication with server 120. Additionally or alternatively, storage device 130 may be part of a storage area network (SAN) that includes a plurality of storage devices, routers, network connections, etc. The system described herein may be implemented using software, hardware, and/or a combination of software and hardware where software may be stored in an appropriate storage medium and executed by one or more processors.

Storage device 130 may store one or more full backups and one or more incremental backups. In an embodiment, server 120 initially performs a full backup of all the data on the system. The full backup may be followed by incremental backups, which only include data that is new, modified, or deleted since the last backup.

In an embodiment, storage system 100 includes multiple servers. These servers need not be physical. The servers may be virtual servers residing in a physical server, or may be a single virtual server residing across multiple physical servers. In some embodiments, different servers may be responsible for different tasks. For example, one server may be a database server that records transactions from data sources 110. Another server may be a backup server for performing full and incremental backups. During an incremental backup, all transactions since a previous incremental backup may be obtained from the database server and recorded as transaction logs by the backup server. The transaction logs may then be stored on storage device 130. During a restore, the transaction logs and the full backups may be located and retrieved from storage device 130 by the backup server. The full and incremental backups may then be sent to the database server to restore the data on data sources 110 to a restore point-in-time.

In some embodiments, an intermediary may be used to connect the backup server and the database server. For example, EMC's Networker Server, or a similar product, may use Microsoft's Virtual Backup Device Interface (VDI) to communicate with Microsoft SQL Server. Through VDI, backups and restores may be performed by Networker Server on data stored by SQL Server. SQL Server may record all transactions from repositories. During an incremental backup, Networker Server may request from SQL Server all transactions since a previous incremental backup. The transactions may be stored on storage device 130 as incremental backups. During a restore, Networker Server may locate full and incremental backups on storage device 130, and send the information related to the backups through VDI to SQL Server. SQL Server may then restore the data on to a point-in-time.

In some embodiments, the system of FIG. 1 may be implemented as a cloud component in a cloud computing environment. Additionally or alternatively, individual components shown in FIG. 1 may be implemented in a cloud computing environment. For example, server 120 may provide hosts and clients backup services in a network cloud.

Figure 2A:
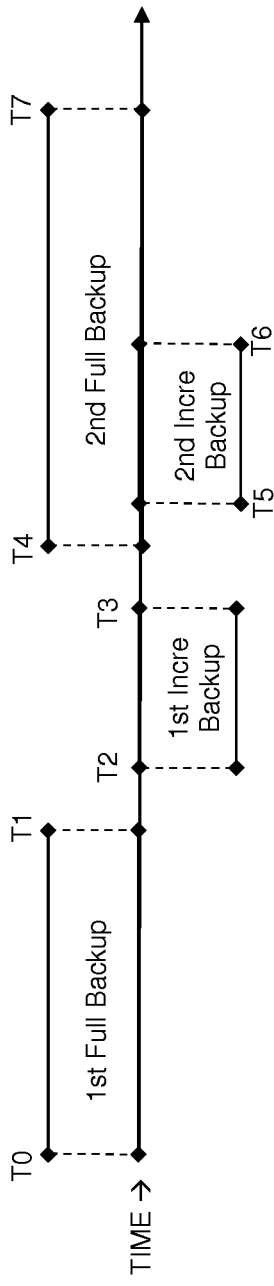
FIG. 2A-FIG. 2C describes structures of backup data in accordance with some embodiments.
Figure 2B:
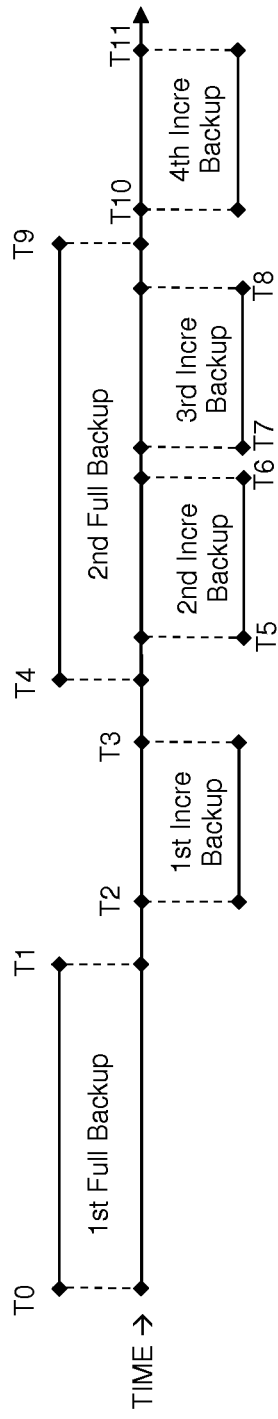
Figure 2C:
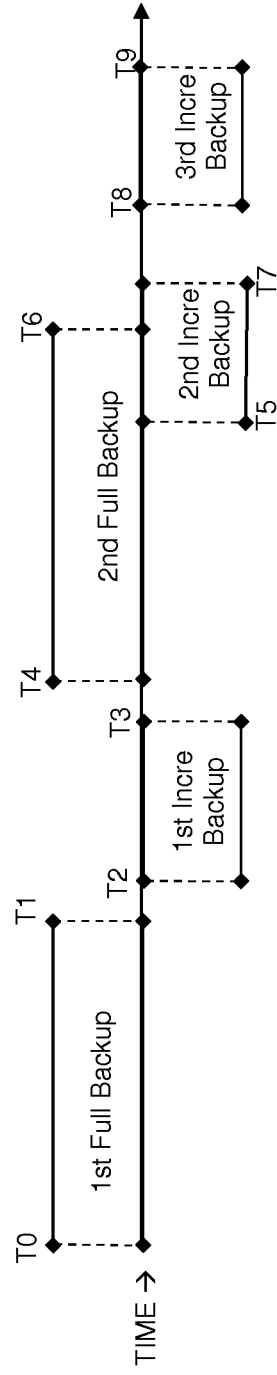

FIGS. 2A, 2B, and 2C describe structures of backup data in accordance with some embodiments. The timeline reflects moments when backups were created. In the structure of FIG. 2A, the first backup may be a full backup starting at point-in-time T0 and ending at point-in-time T1. Following the first full backup, an incremental backup, denoted as first incremental backup in FIG. 2A, may be performed from time T2 to T3. After a period of time, the second full backup may be performed from time T4 to T7. To improve efficiency, storage system 100 may be configured to allow simultaneous full and incremental backups. For example, second incremental backup may start at time T5, after the start time of the second full backup T4, but before the end time of the second full backup T7.

Running full and incremental backups simultaneously may make it difficult to locate correct full and incremental backup data for effective restore. For example, to restore data to a point-in-time between T2 and T5, conventional methods and systems may attempt to restore second full backup, followed by the second incremental backup on top of the second full backup. Since the second incremental backup runs simultaneously with the second full backup, however, the restore may yield an incomplete result. The correct result may be obtained by restoring the first full backup, followed by the first and the second incremental backup. Further, some conventional storage systems may require an incremental backup be restored on top of the relevant full backup in the same order the backups were taken. In such systems, any attempt to restore the second incremental backup on top of the second full backup may cause error, since the completion of the second full backup did not happen before the second incremental backup began.

In the backup data structure illustrated in FIG. 2B, in order to recover data to a point-in-time between T7 and T10, conventional systems may attempt to restore the second full backup, followed by the second, third, and fourth incremental backups. Such an attempt may result in error, since the correct approach may be restoring the second full backup, followed by the fourth incremental backup.

FIG. 2A and FIG. 2B illustrate backup data structures where an incremental backup starts after the start time of a full backup and ends before the end time of the full backup. FIG. 2C illustrates backup data structure where an incremental backup partially runs simultaneously with a full backup. In FIG. 2C, the first backup may be a full backup starting at point-in-time T0 and ending at point-in-time T1. Following the first full backup, an incremental backup may be performed from time T2 to T3. After a period of time, a second full backup may be performed from time T4 to T6. Since a full backup may take a long time to complete, storage system 100 may be configured to allow performing incremental backups simultaneously with a full backup to improve efficiency. For example, second incremental backup may start at time T5, after the start time of the second full backup T4, and end at time T7, after the end time of the second full backup T6.

To recover data to a point-in-time between T4 and T5, conventional methods and systems may attempt to restore second full backup, followed by the second and third incremental backups. Since the second incremental backup runs simultaneously with the second full backup, however, the restore may yield an incorrect result. The correct result may be obtained by restoring the first full backup, followed by the first and second incremental backups.

To recover data to a point-in-time between T5 and T8, conventional methods and systems may incorrectly attempt to restore the second full backup, followed by the second and third incremental backups. The correct result may be obtained by restoring the first full backup, followed by the first, second, and third incremental backups.

Figure 3:
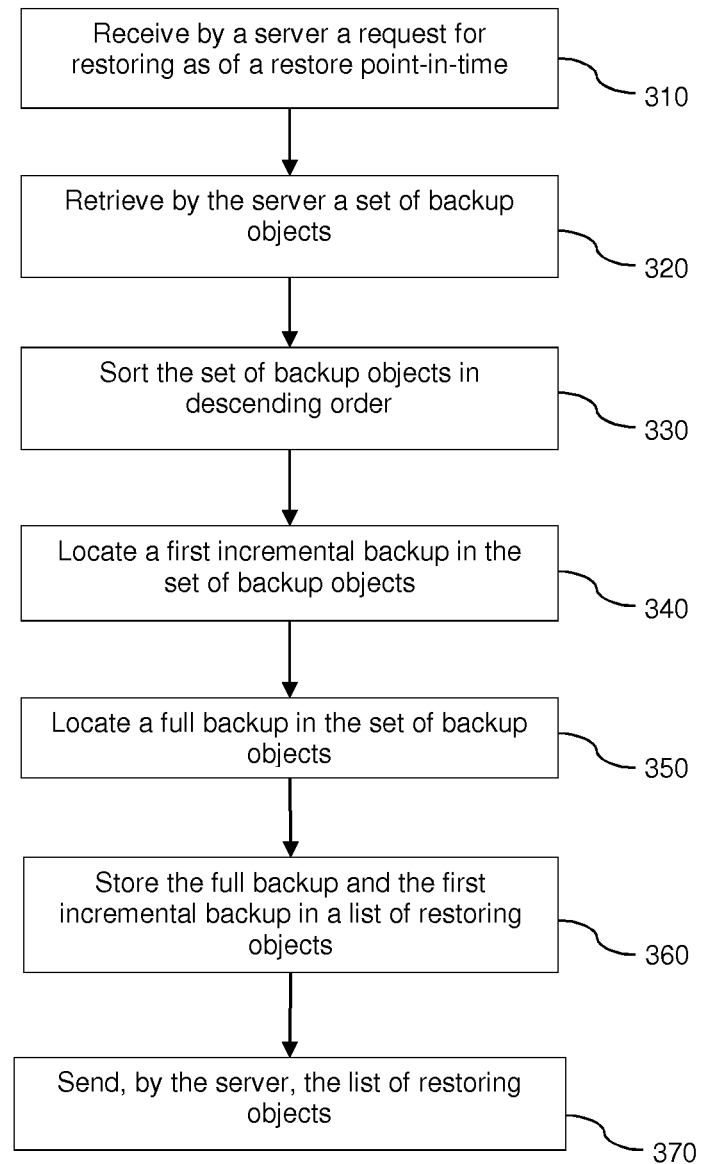
FIG. 3 is a flowchart illustrating restoring in accordance with some embodiments.

To address the problems encountered in conventional methods and systems, FIG. 3 is a flowchart illustrating a process for effectively restoring systems that allow simultaneous full and incremental backups. In step 310, a server may receive a request to restore data to a point-in-time. At block 320, the server may retrieve a set of backup objects. Each backup object may be associated with a type indicating whether the object is related to a full backup or an incremental backup. In some embodiments, the backup objects may also be associated with timestamps indicating backup start and/or end times. At 330, the backup objects may be sorted in descending order of each backup object start time. For example, backups starting at 10 am may be placed before backups starting at 9 am, but after backups starting at 11 am.

At 340, a first incremental backup may be located based on the restore point-in-time and the timestamps associated with the incremental backups. For example, the restore point-in-time in the restore request may be 9 am. An incremental backup may have a start time of 10 am and record some changes since last incremental backup. If the last incremental backup starts at 8 am, without other incremental backups in between 8am and 10 am, the incremental backup may be located as the first incremental backup. The first incremental backup is located because the 10 am incremental backup has a start time after the restore point-in-time and contains the changes at the restore point-in-time of 9 am.

At 350, a full backup may be located in the sorted set of backup objects. For example, once a first incremental backup with a start time of 10 am is located, next backup objects in the sorted set may have start time before 10 am. A full backup with a closest start time before 10 am may then be located. At 360, both the full backup and the first incremental backup may be stored in a list of restoring objects. Finally, at step 370, the list of restoring objects may be used by the server to reconstruct the data to the restore point-in-time.

Figure 4:
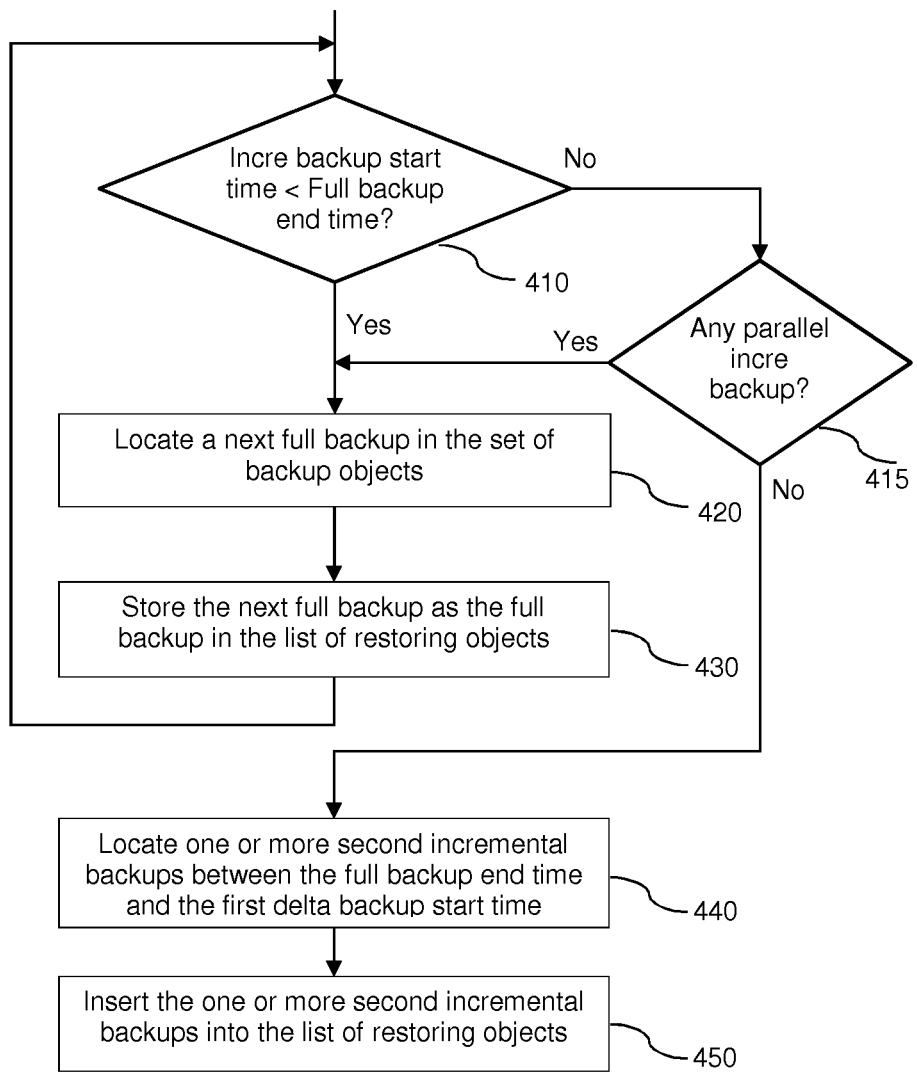
FIG. 4 is a flowchart illustrating locating correct full backup and incremental backups in accordance with some embodiments.

FIG. 4 illustrates a process for constructing the list of restoring objects. At 410, the first incremental backup start time may be compared with the full backup end time. If the first incremental backup started before the full backup ended, the first incremental backup may have run simultaneously with the full backup. If the backups were simultaneous, at 420 a next full backup in the descending ordered set of backup objects may be located. At 430, the next full backup located may be stored as the full backup in the list of restoring objects. Blocks 410 through 430 may repeat until a next full backup with an end time before the first incremental backup start time is found. Once a correct full backup is found, at 415 another determination is made to identify full backups running simultaneously with incremental backups. If any incremental backup ran before the end time of the full backup, whether in part or in whole, blocks 410 through 430 may repeat.

For example, if the start time and the end time of the full backup are 9 am and 10 am respectively, then the existence of any incremental backup with a start time between 9 am and 10 am may result the repeating of step 410 through step 430. If the full backup does not run simultaneously with any incremental backups, one or more second incremental backups may be located at block 440. Each of the one or more second incremental backups located at block 440 may have a start time between the full backup end time and the first incremental backup start time. At 450, the one or more second incremental backups may be inserted into the list of restoring objects.

For the sake of clarity, the processes and methods herein have been illustrated with a specific flow, but it should be understood that other sequences may be possible and that some may be performed in simultaneous, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a simultaneous or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for restoring in a back system allowing simultaneous full backups and incremental backups, the method comprising:
   receiving, by a server, a request for restoring as of a restore point-in-time;
   in response to the request, retrieving by the server a set of backup objects comprising the full backups and the incremental backups;
   sorting the set of backup objects in descending order;
   locating a first full backup in the set of backup objects wherein a start time of the first full backup is prior to the restore point-in-time, an end time of the first full backup is before a start time of a first incremental backup and there are no incremental backups running in parallel with the first full backup;
   locating a second full backup in the set of backup objects wherein a start time of a second incremental backup is before an end time of the second full backup and the second incremental backup runs in parallel with the second full backup and the first full backup is before the second full backup;
   locating one or more incremental backups in the set of backup objects, wherein start times of the one or more incremental backups in the set of backup objects are after the end of the first full backup;
   storing the first full backup and the first one or more incremental backups without the second full backup in a list of restoring objects; and
   sending, by the server, the list of restoring objects.

2. The method as recited in claim 1, wherein the server includes a database server and a backup server connected through an intermediary.

3. The method as recited in claim 1, wherein each of the set of backup objects is associated with a type, a start time, and an end time.

4. The method as recited in claim 3, wherein sorting the set of backup objects in descending order including sorting the set of backup objects in descending order is based on the start time associated with each of the set of backup objects.

5. The method as recited in claim 1, wherein the start time of the first incremental backup is after the restore point-in-time and is the closest to the restore point-in-time.

6. The method as recited in claim 1, wherein the first full backup start time is the closest to the first incremental backup start time.

7. The method as recited in claim 1, wherein the first incremental backup contains changes at the restore point-in-time.

8. The method as recited in claim 7, wherein the start time of the second incremental backup is after the restore point-in-time.

9. A backup storage system allowing simultaneous full backups and incremental backups, the system comprising: a processor configured to receive, by a server, a request for restoring as of a restore point-in-time,
in response to the request, retrieve by the server a set of backup objects comprising the full backups and the incremental backups,
sort the set of backup objects in descending order,
locate a first full backup in the set of backup objects wherein a start time of the first full backup is prior to the restore point-in-time, an end time of the first full backup is before a start time of a first incremental backup and there are no incremental backups running in parallel with the first full backup based on the first incremental backup start time, a full backup start time and a full backup
locate a second full backup in the set of backup objects wherein a start time of a second incremental backup is before an end time of the second full backup and the second incremental backup runs in parallel with the second full backup and the first full backup is before the second full backup,
locate one or more incremental backups in the set of backup objects, wherein start times of the one or more incremental backups in the set of backup objects are after the end of the first full backup;
store the first full backup and the one or more incremental backups without the second fully backup in a list of restoring objects, and
send, by the server, the list of restoring objects.

10. A computer program product comprising a non-transitory computer usable medium having machine readable code embodied therein for restoring from a set of backup objects created in a back system allowing simultaneous full backups and incremental backups, the computer program product comprising:
   receiving, by a server, a request for restoring as of a restore point-in-time;
   in response to the request, retrieving by the server a set of backup objects comprising the full backups and the incremental backups;
   sorting the set of backup objects in descending order;
   locating a first full backup in the set of backup objects wherein a start time of the first full backup is prior to the restore point-in-time, an end time of the first full backup is before a start time of a first incremental backup and there are no incremental backups running in parallel with the first full backup;
   locating a second full backup in the set of backup objects wherein a start time of a second incremental backup is before an end time of the second full backup and the second incremental backup runs in parallel with the second full backup and the first full backup is before the second full backup;
   locating one or more incremental backups in the set of backup objects, wherein start times of the one or more incremental backups in the set of backup objects are after the end of the first full backup;
   storing the first full backup and the one or more incremental backups without the second fully backup in a list of restoring objects; and
   sending, by the server, the list of restoring objects.

* * * * *